United States Patent [19]

Fourrey et al.

[11] Patent Number: 4,645,263
[45] Date of Patent: Feb. 24, 1987

[54] INCLINING MECHANISM FOR A SEAT AND IN PARTICULAR FOR AN AUTOMOBILE

[75] Inventors: Francois Fourrey, Montbeliard; Jean Perrissin-Fabert, Manbeure, both of France

[73] Assignee: Cycles Peugeot, Valentigney, France

[21] Appl. No.: 668,924

[22] Filed: Nov. 6, 1984

[30] Foreign Application Priority Data

Nov. 16, 1983 [FR] France ................. 83 18225

[51] Int. Cl.⁴ ............................................. B60N 1/02
[52] U.S. Cl. ..................................... 297/366; 297/367
[58] Field of Search ............... 297/366, 367, 368, 369, 297/370, 371, 379, 354, 355, 300, 285

[56] References Cited

U.S. PATENT DOCUMENTS

| | | | |
|---|---|---|---|
| 2,336,013 | 12/1943 | Hamilton | 297/367 |
| 3,156,004 | 11/1964 | Strien et al. | 297/367 X |
| 3,870,269 | 3/1975 | Werner et al. | 297/366 X |
| 4,165,900 | 8/1979 | Pesiri | 297/369 |
| 4,178,037 | 12/1979 | Pickles | 297/379 X |
| 4,223,946 | 9/1980 | Kluting | 297/367 X |

FOREIGN PATENT DOCUMENTS 2302703 10/1976 France ................. 297/368

Primary Examiner—Kenneth J. Dorner
Assistant Examiner—Mark W. Binder
Attorney, Agent, or Firm—Sughrue, Mion, Zinn, Macpeak, and Seas

[57] ABSTRACT

This mechanism comprises a fixed side wall 2 connected to the base of the seat and a movable side wall 1 connected to the seat back. The fixed side wall 2 comprises two centering spigots 4, 34 which are drawn from the thickness of the material from which the fixed side wall is made and which receive respectively the movable side wall and a control lever 30. Blocks 10, 12 receive a toothed pawl 14 which is capable of being locked to the set of teeth of the movable side wall. A spring 50, which tends to bias the movable side wall upwardly, maintains in position a housing 56 which laterally retains the stack of component parts.

10 Claims, 5 Drawing Figures

INCLINING MECHANISM FOR A SEAT AND IN PARTICULAR FOR AN AUTOMOBILE

The present invention relates to an inclining mechanism of the type providing a discontinuous adjustment, or an adjustment by steps, i.e. a mechanism in which a toothed sector is connected to the seat back while another sector is slidably mounted in such manner as to lock the first sector or to be spaced therefrom so as to permit its pivoting.

The manufacture of mechanisms of this type at the present time involves the stacking or the relative positioning of the various parts and then their fixing by riveting, welding, forming over or bolting. Consequently, this manufacture requires two successive operations. Further, it is delicate since it is necessary to arrange that the fixing means be capable of possibly resisting impacts, for example upon a sudden braking or in the event of an accident.

An object of the present invention is to overcome these drawbacks and to provide a mechanism whose manufacture is simplified while its resistance to impacts or the like is increased.

The invention therefore provides a mechanism for adjusting the inclination of the seat back of a seat and in particular a seat of a vehicle, comprising two side walls, one fixed to the seat back and the other to the seat base, each side wall carrying a toothed sector, and means for controlling the displacement of one of said sectors between a position in which it is engaged with the other sector (for locking the pivotal mounting) and a spaced-away position for the pivoting of the seat back. In these mechanisms, the various parts are assembled together by a simple fitting together and maintained in position by a housing which is itself retained laterally by a spring for straightening the seat back mounted between the movable side wall and a fixed point in the vicinity of the opposite end of the other side wall (on the housing).

In such a mechanism the assembly is effected automatically by a simple positioning and fitting together of the parts with no additional operation.

Preferably, at least one of the parts to be assembled, and in particular the fixed side wall, comprises centering bosses and/or lugs, while the other part or parts comprise apertures or openings of corresponding shape which are fitted on these bosses or lugs.

Preferably, the lugs and the bosses are taken from the thickness of the sheet constituting the part, so that the part can have great strength and the construction is facilitated.

The following description of one embodiment, which is merely given by way of a non-limiting example and shown in the accompanying drawings, will bring out the features and advantages of the invention.

The mechanism for adjusting the inclination comprises, in the known manner, a side wall 1 fixed to the seat back of the seat which must be adjusted, and a side wall 2 fixed to the base of this seat.

Figure 1:
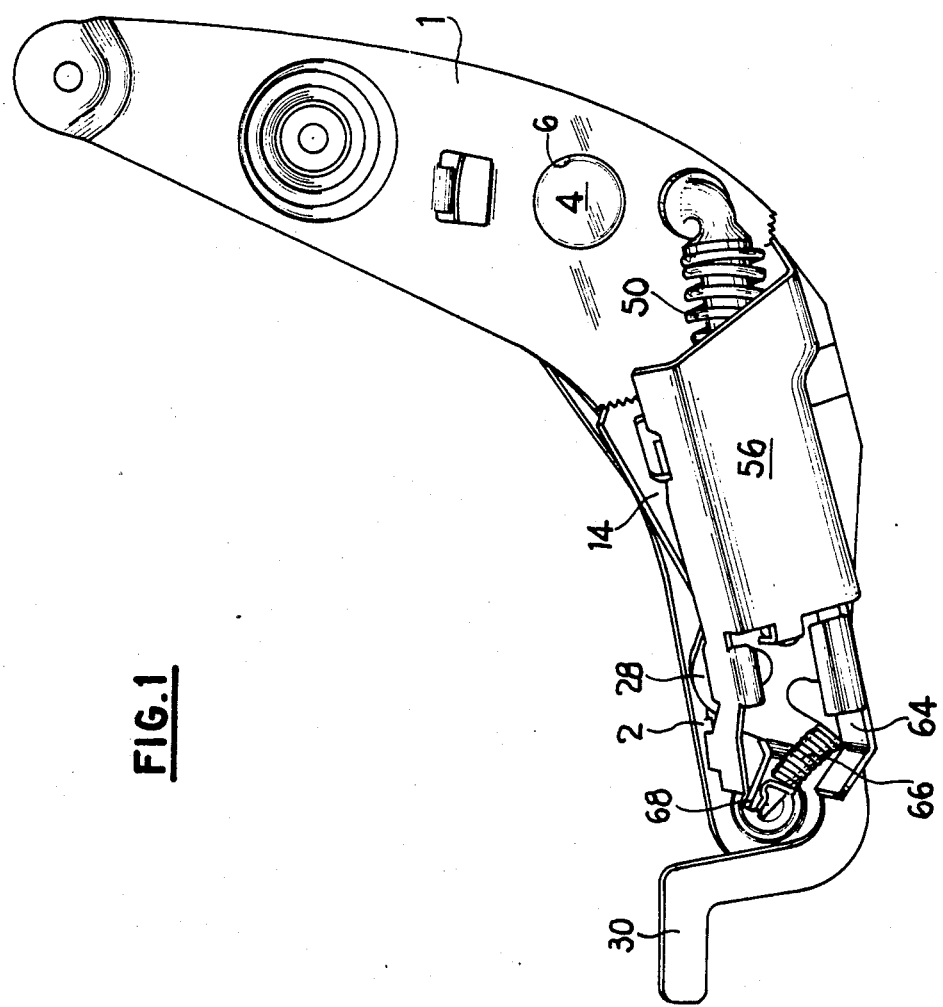
FIG. 1 is a side elevational view of an inclining mechanism according to the invention.
Figure 2:
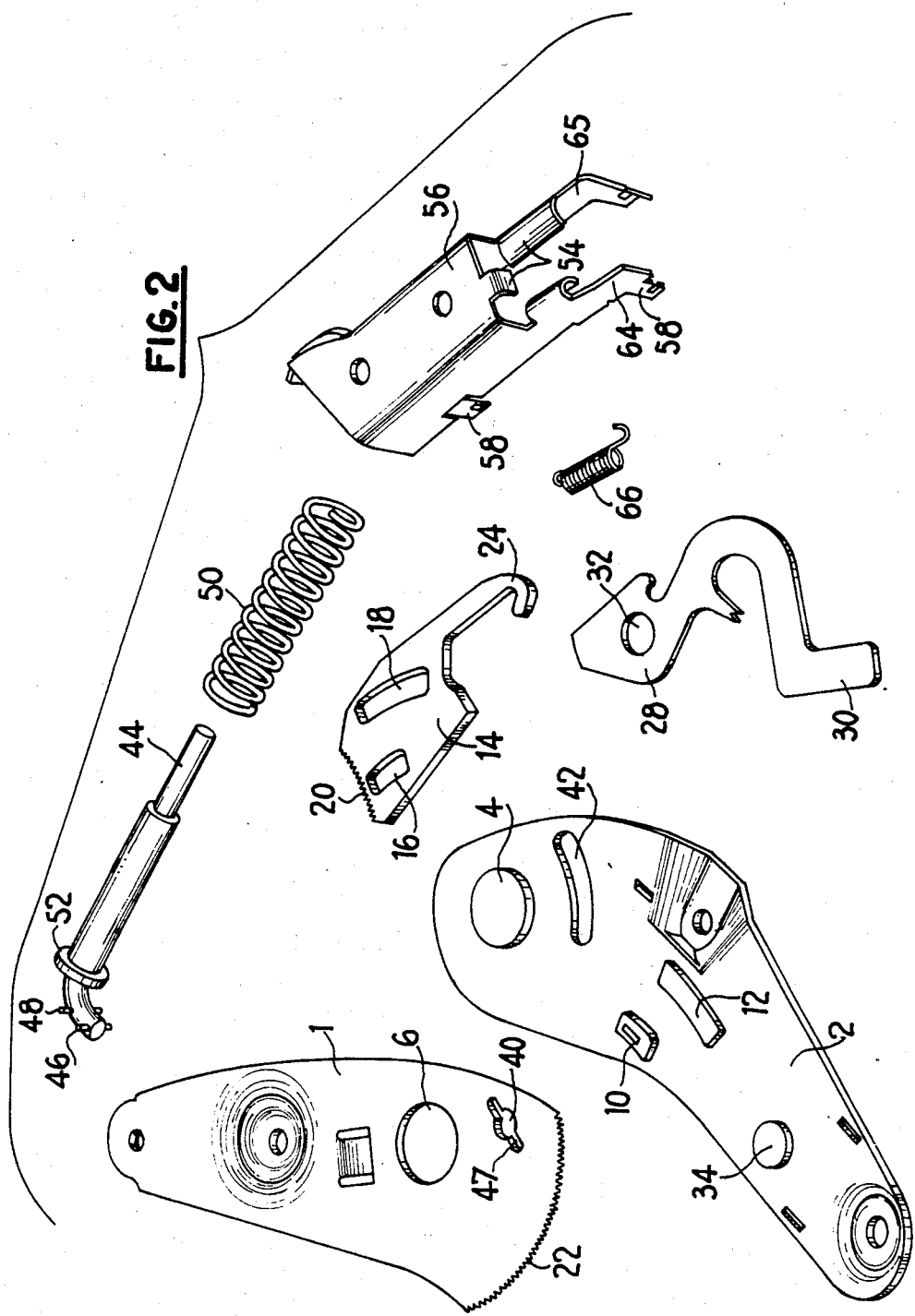
FIG. 2 is an exploded view of the mechanism shown in FIG. 1.
Figure 3:
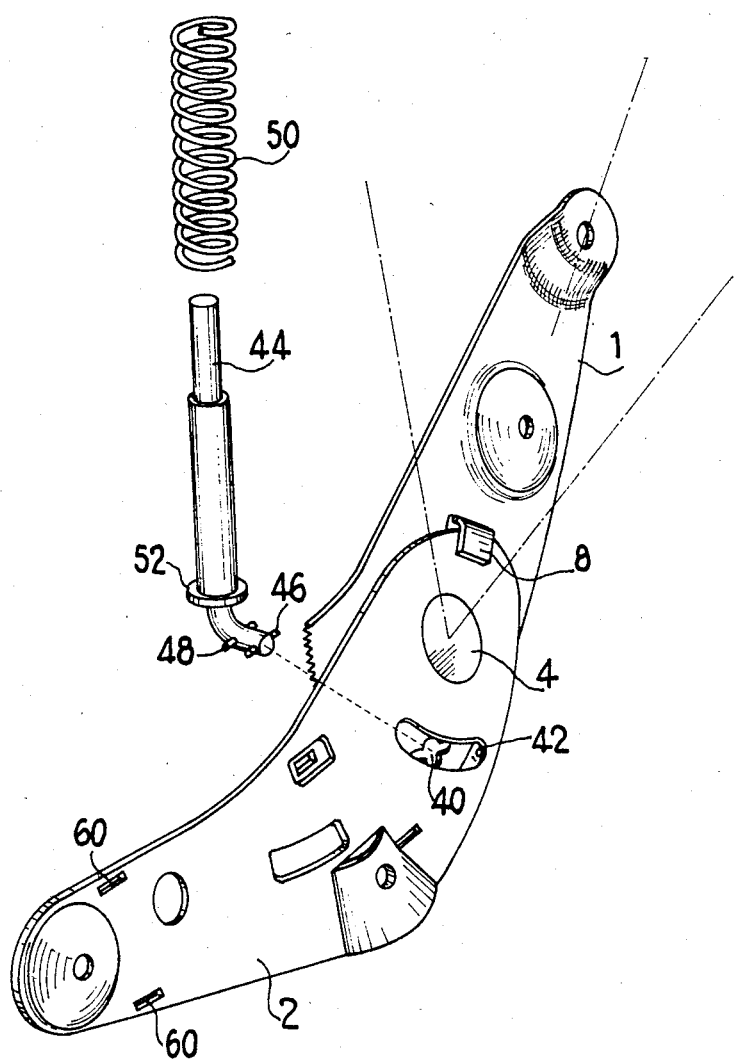
FIG. 3 is an elevational view of the assembly of the fixed and movable side walls, this view being from the side opposed to that of FIG. 1.

As shown in the drawings, and particularly in FIGS. 1, 2 and 3, the fixed wall 2 comprises a projection or boss 4 which forms part of pivot means/and is drawn from the thickness of the sheet constituting this side wall, i.e. which projects from one of the sides of the side wall, while a cavity is formed on the opposite side. The movable side wall 1 comprises an aperture 6 having a diameter similar to the diameter of the boss 4 which is adapted, when the mechanism is assembled, to fit on this boss as shown in FIG. 1 and to form the pivot means. The side wall 1 also has a tab 8 which is blanked and formed outwardly in the direction of the fixed side wall 2. This tab laterally immobilizes the corresponding end of the fixed side wall 2 which can be easily fitted therebetween and the movable side wall 1 by a pivoting about the boss 4. The fixed side wall 2 comprises moreover two curved projections or lugs, respectively 10 and 12, on which is fitted a flat pawl 14 which has curved openings 16 and 18. The curvature of the openings 16 and 18 corresponds to that of the lugs 10 and 12 but their length is greater than that of these lugs so that the pawl 14 is slidable in a direction parallel to its plane on the fixed side wall 2 and is guided by the lugs 10 and 12 the remains in contact with the side wall 2.

Figure 4:
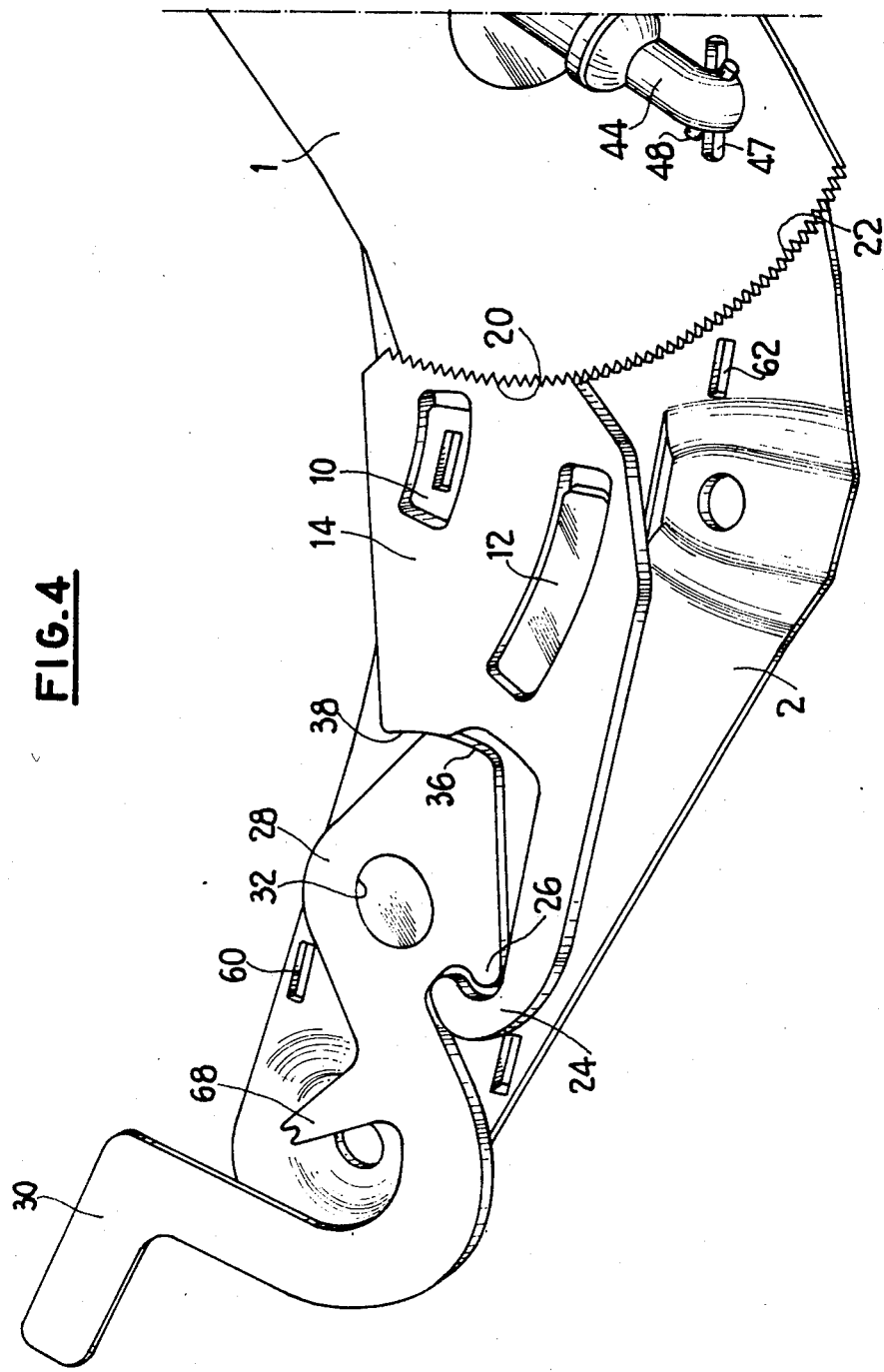
FIGS. 4 and 5 are views, to an enlarged scale, of the inclining mechanism shown in FIG. 1, before the springs and the protective housing have been placed respectively in the locking position and in the position for pivoting the seat back.
Figure 5:
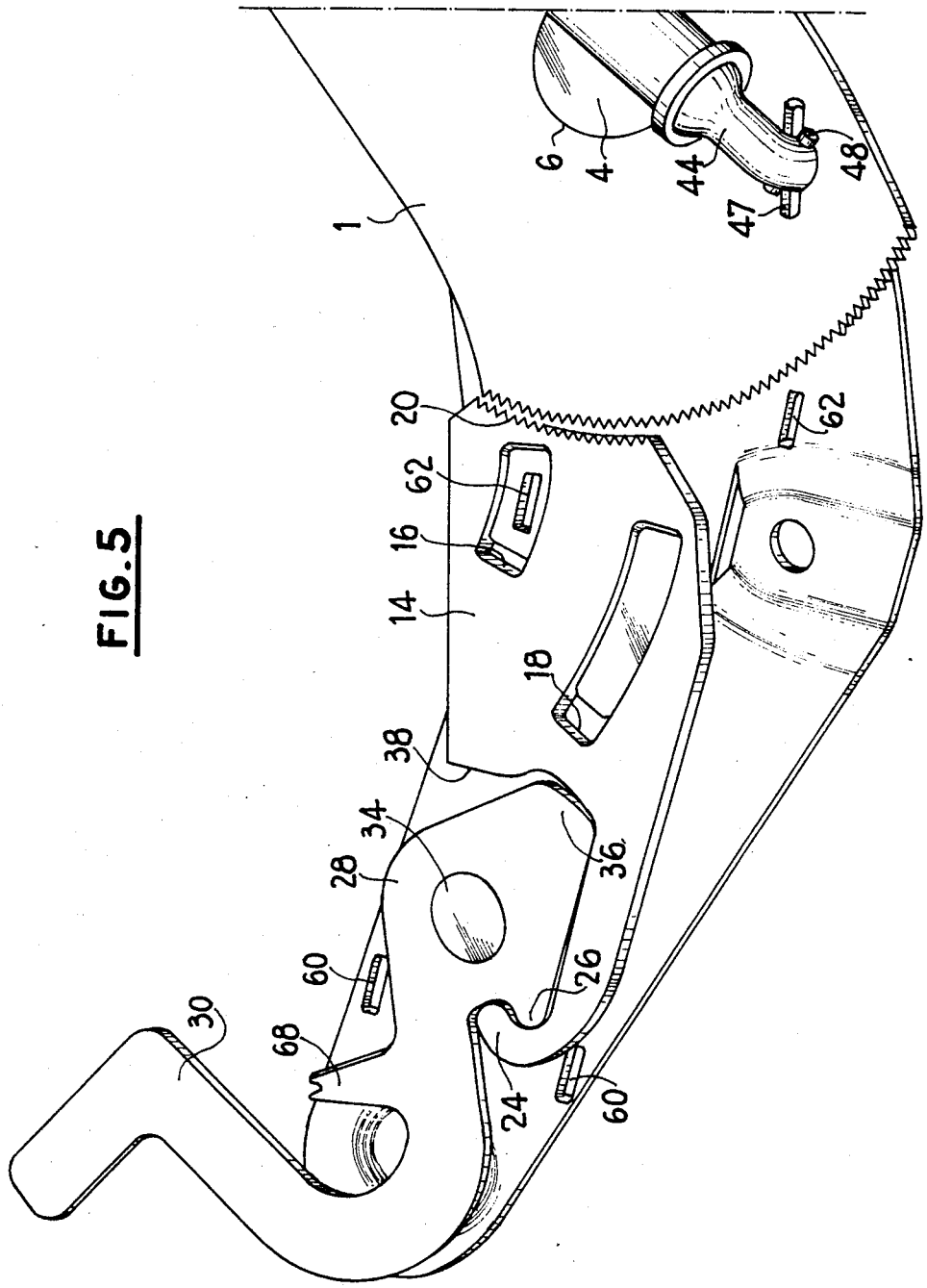

The pawl 14 also includes a toothed sector 20 which is capable of engaging with a set of teeth 22 carried by the end edge of the movable side wall 1. The sets of teeth 20 and 22 have corresponding curvatures so that they can remain in mesh throughout the angular positions of either of these two elements. Owing to the clearance provided between the lugs 10, 12 and the openings 16, 18, and pawl 14 can thus be locked to the side wall 1 (FIG. 4) or moved away from the set of teeth 22 of this side wall, as shown in FIG. 5.

In order to facilitate this movement, the pawl 14 is extended by a hook 24 which cooperates with the nose 26 of a cam 28 formed at the end of a control lever 30. The lever 30 comprises, substantially in the centre of the cam 28, an aperture 32 which permits fitting it on a projection or boss 34 which constitutes pivot means with the aperture 32 and is rigid with the side wall 2 and, preferably, drawn from the thickness of the material of this side wall. The cam 28 further includes a curved surface 36 which comes into contact with a ramp 38 of corresponding shape of the pawl 14 in the locking position of the lever 30 shown in FIG. 4. In this position, indeed, the nose 26 of the cam 28 is disengaged from the hook 24 while the surface 36 bears against the ramp 38 so as to urge the pawl 14 against the set of teeth 32 thus locking the side wall 1.

On the other hand, when the lever is pivoted in the clockwise direction as viewed in the drawings, the surface 36 guides the ramp 38 and the nose 26 bears against the hook 24 and exerts a pull thereon which shifts the pawl 14 and moves the toothed sector 20 away from the set of teeth 22. Consequently, the side wall 1 is released and is free to pivot about the boss 4, as shown in FIG. 5.

The movable side wall 1 further comprises an aperture 40 which, upon assembly, is located in facing relation to a curved opening 42 in the fixed side wall 2, the opening 42 being centered on the pivot axis of the side wall 1, i.e. on the axis of the centering boss 4. A bent tube 44 is inserted in the aperture 40 in such manner as to extend into the opening 42. The tube 44 is immobilized relative to the movable side wall 1 by the action of two pairs of diametrically opposed lugs, respectively 46 and 48, which are spaced apart axially along the tube but are offset from each other. The lugs 46 which are the closest to the end of the tube 44 extend through lateral extensions 47 of the aperture 40 while the lugs 48 are stopped by the wall of this aperture, as clearly shown in FIGS. 4 and 5 in which the tube 44 has been shown in a position in which it has been moved away its final position (as shown in FIG. 1) so as to facilitate the understanding of the drawing. The dimension of the lugs 46 is however such that they can move through the opening 42 when pivoting the side wall 1. The length of the opening 42 consequently controls the angle through which the side wall 1 is capable of pivoting.

Mounting on the tube 44 is a coil spring 50 which bears at one end against a flange 52 of the tube and, at the opposite end, against tabs 54 carried by the end of a housing 56 (FIGS. 1 and 2). The housing 56, which has a generally U-shape, is provided with lugs 58 adapted to enter into slots 60, 62 formed in the side wall 2, on one hand, in the vicinity of its end opposed to the side wall 1, and, on the other hand, in the vicinity of this side wall 1. The lugs 58 and slots 60, 62 serve to locate the housing relative to the side wall 2. Consequently, the housing 56 extends above the various component parts of the mechanism and the same is true of the spring 50. The latter is thus put under compression between the side wall 1 and the housing 56. The latter applies the cam 28 of the lever 30 and the pawl 14 against the side wall 2. The spring 50 also biases the housing 56 against this side wall while the housing provides the exterior protection of the assembly.

Further, the spring 50 is fixed to the flange 52 of the tube 44 which is mounted in an aperture 40 provided in the vicinity of the set of teeth 22 and in the vicinity of the outer edge of the side wall and constantly exerts on the base of the movable side wall 1 a pressure which tends to straighten or pivot up the seat back, which is rigid with this side wall, to the vertical position.

The housing 56 is extended beyond the tabs 54 against which the spring 50 bears, by arms 64 each of which terminates in a lug 58, at least one of which lugs is provided with an aperture 65 for fixing the end of a small spring 66 whose opposite end is hooked to a fork 68 which laterally projects from the arm 30 (FIGS. 1 and 5). The spring 66 exerts a pull on the fork 68 and biases it toward the housing 56 and the lever 30 toward the locking position shown in FIG. 4, which causes the pawl 14 to slide along the guiding blocks 10 and 12 and lock the side wall 1, and consequently the seat back, in the chosen position. A simple force exerted on the lever 30 against the action of this spring 66 however enables the side wall 1 to be released and the seat back inclination to be modified, the lever 30 automatically resuming the locking position as soon as it is released.

In order to assemble such a mechanism, it is sufficient to fit together the various component parts. Indeed, the side walls 1 and 2 are first of all assembled by fitting the boss 4 in the aperture 6 of the side wall 1, and then in pivoting the two side walls so as to slide the edge of the side wall 2 under the tab 8 (FIG. 3). The pawl 14 is placed on the side wall 2, its openings 16, 18 being placed on the curved blocks 10 and 12 which centre it exactly in the transverse direction while allowing it a limited longitudinal displacement. The lever 30 is then mounted on the boss 34 so that the cam 28 moves in front of the hook 24. The introduction of the tube 44 in the apertures 40 and the opening 42 and then the mounting of the housing 56 by urging its lugs 58 in the slots 60, 62 and by blocking its tabs 54 against the spring 50 then completes the lateral maintenance of all these component parts. The spring 66 is then placed in position between the fork 68 and the arm 64 of the housing and the mechanism is ready for use.

A single stacking with a fitting together of the component parts was necessary; no additional fixing operation is to be effected.

An inclining mechanism is thus obtained which operates in an extremely reliable manner and has no bolt, rivet, or means liable to break upon impact or the like. On the other hand, the component parts of the mechanism are distinctly centered and effectively guided with respect to each other.

What is claimed is:

1. A mechanism for adjusting the inclination of a seat back on a base of a seat, and in particular a vehicle seat, comprising two side walls, one side wall being movable for securing to the seat back and the other side wall being fixed for securing to the base of the seat, pivot means interconnecting the two side walls and defining a pivot axis about which the movable side wall is pivotable for adjusting the position of the seat back, an arcuate toothed sector integral with the movable side wall and centered on said axis, a toothed pawl, means for guiding the pawl on the fixed side wall so that the pawl is movable relative to the fixed side wall between a first position in which the toothed pawl is engaged with the toothed sector for immobilizing the movable side wall relative to the fixed side wall and a second position in which the pawl is withdrawn from the toothed sector, means for shifting the pawl between said two positions thereof, a housing combined with the fixed side wall for protecting and retaining the movable side wall, the shifting means and the pawl in position on the fixed side wall, means for locating the housing relative to the fixed side wall, a spring interposed between the housing and the movable side wall for biasing the movable side wall to pivot about said axis in a direction to move the seat back toward a more vertical position, said pivot means comprising a projection on one of two elements consisting of the fixed side wall and the movable side wall and an opening in the other of said two elements, said guide means comprising at least one projection on one of two second elements consisting of the pawl and the fixed side wall and an opening in the other of said second elements, said locating means comprising projections on one of two third elements consisting of the housing and the fixed side wall and openings on the other of said third elements, said projections and openings being interengaged in assembled positions of the fixed side wall, movable side wall, pawl and the housing and being adapted to be interengaged merely by a relative sliding between the projections and openings upon assembly of the fixed side wall, the movable side wall, the pawl and the housing, the spring being in bearing relation to the housing in such manner as to, in addition, bias the housing in a direction to maintain said locating means interengaged.

2. A mechanism according to claim 1, wherein the projections of the locating means are in the form of lugs on the housing on which engage the openings in the fixed side wall, and the spring is protected by said housing.

3. A mechanism according to claim 1, wherein said openings of the guide means are defined by the pawl and are elongated and said projections of the guide means are in the form of lugs on the fixed side wall which are shorter than said openings defined by the pawl so that the pawl is slidable on the fixed side wall between said two positions thereof.

4. A mechanism according to claim 3, wherein said means for shifting the pawl comprise a control lever having an end portion cooperative with said pawl.

5. A mechanism according to claim 4, wherein the pawl has a hook and the control lever comprises a portion which forms a nose cooperative with the hook of the pawl for shifting the pawl to said second position thereof, the control lever further comprising a cam and the pawl defining a ramp, said cam being in engaged relation to said ramp in said first position of the pawl.

6. A mechanism according to claim 4, comprising a return spring for biasing the pawl to said first position thereof.

7. A mechanism according to claim 6, wherein the return spring is connected at one end to the housing and at an opposite end to the control lever.

8. A mechanism according to claim 4, comprising pivot means for mounting the control lever on the fixed side wall, said pivot means of the control lever comprising a projection on one of two elements consisting of the fixed side wall and the control lever and an opening on the other of said two elements and engaged on the projection.

9. A mechanicam according to claim 1, wherein the fixed side wall comprises said projections of said pivot means and guide means, the movable side wall and the pawl defining said openings which fit onto said projections.

10. A mechanism according to claim 9, wherein the projections of the pivot means and pawl are drawn from the thickness of a metal sheet from which the fixed side wall is made.

* * * * *